(No Model.)   2 Sheets—Sheet 2.

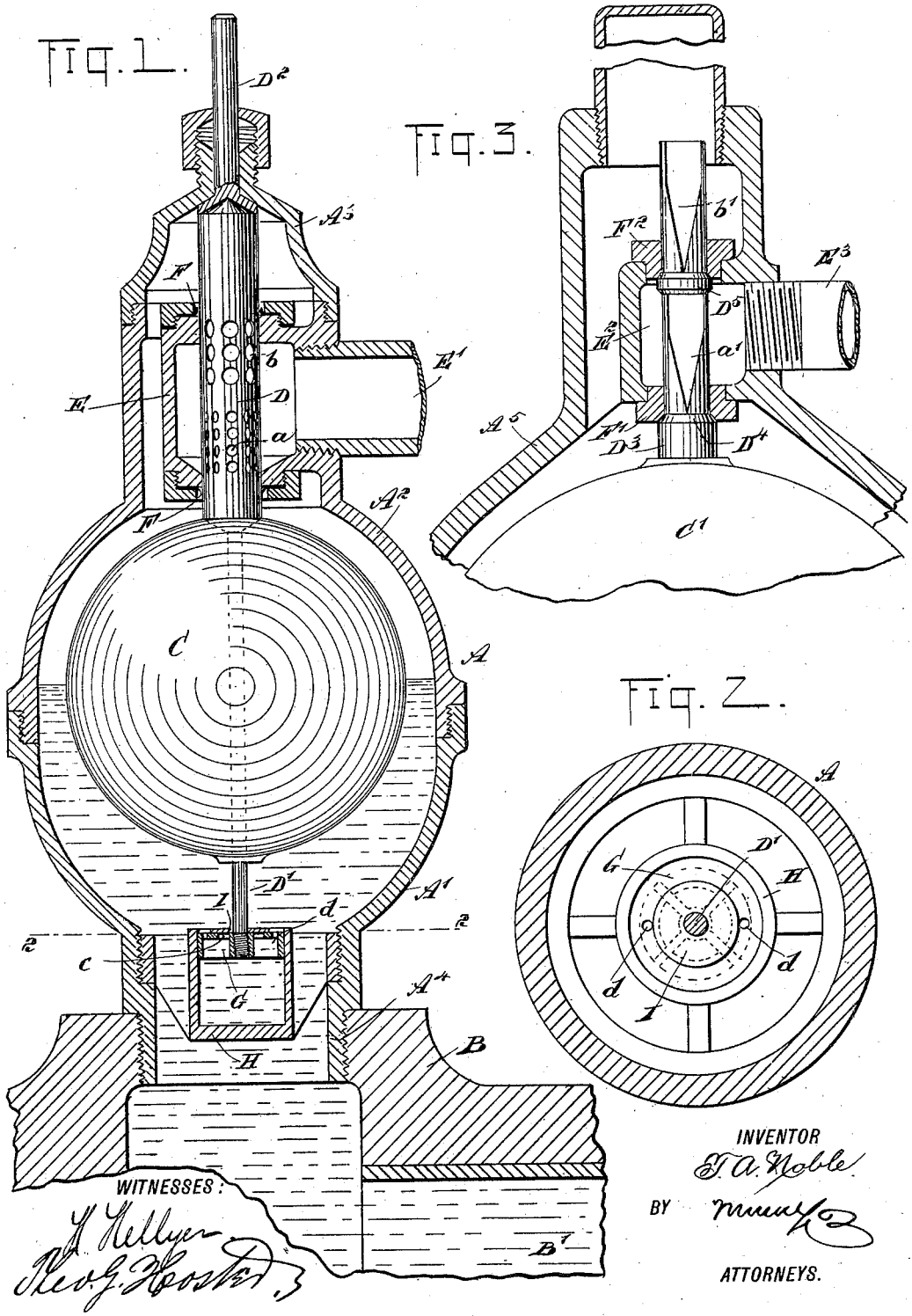

T. A. NOBLE.
AIR VALVE FOR WATER PIPE LINES.

No. 598,386.   Patented Feb. 1, 1898.

WITNESSES:

INVENTOR
T. A. Noble
BY
ATTORNEYS.

UNITED STATES PATENT OFFICE.

THERON A. NOBLE, OF SEATTLE, WASHINGTON, ASSIGNOR TO HIMSELF, AND JAMES D. SCHUYLER, OF LOS ANGELES, CALIFORNIA.

AIR-VALVE FOR WATER PIPE-LINES.

SPECIFICATION forming part of Letters Patent No. 598,386, dated February 1, 1898.

Application filed March 8, 1897. Serial No. 626,446. (No model.)

*To all whom it may concern:*

Be it known that I, THERON A. NOBLE, of Seattle, county of King and State of Washington, have invented a new and Improved Air-Valve for Water Pipe-Lines, of which the following is a full, clear, and exact description.

The object of the invention is to provide a new and improved air-valve for water pipe-lines or other chambers containing water, and which is simple and durable in construction, very effective in operation, and arranged to let out air when the pipe-line or chamber is being filled, to let in air when the pipe breaks or is being emptied, and thus prevent a collapse, and to open and let out accumulated air that has collected at the summits of the pipe-line without allowing the water to escape, and to prevent the hammering of the water.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the views.

Figure 4:
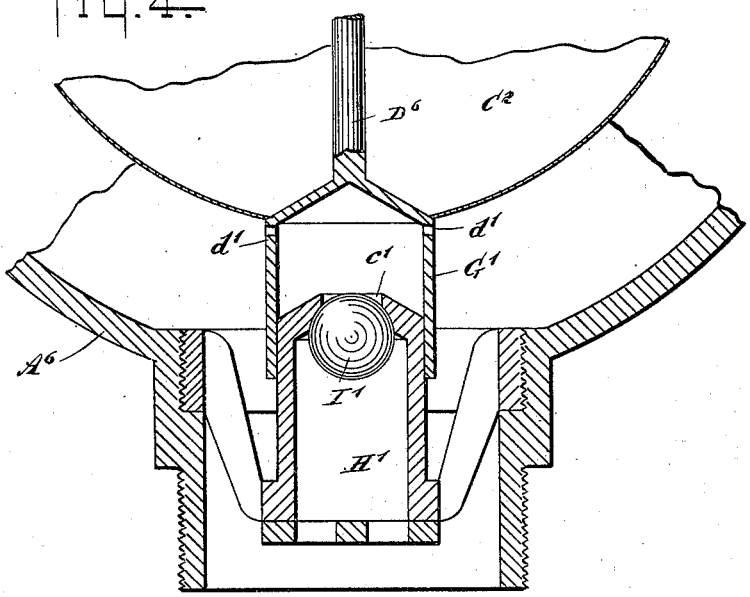
Figure 5:
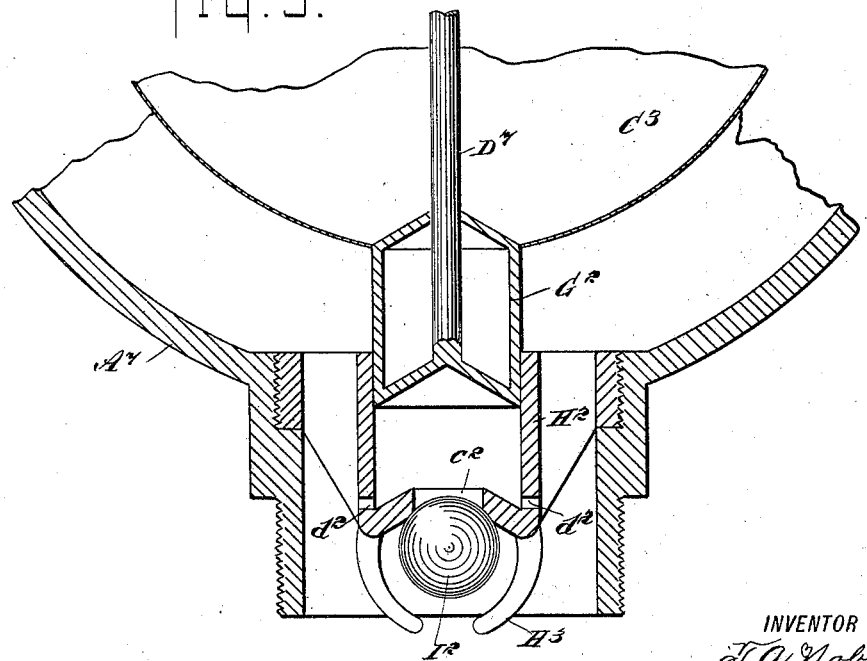

Figure 1 is a sectional side elevation of the improvement. Fig. 2 is a sectional plan view of the same on the line 2 2 of Fig. 1. Fig. 3 is a sectional side elevation of a modified form of the improvement. Fig. 4 is a similar view of a modified form of the slow-return attachment for the valve. Fig. 5 is a like view of a modified form of the same.

The improvement illustrated in Figs. 1 and 2 is provided with a casing A, formed in sections $A'$, $A^2$, and $A^3$, screwed or otherwise fastened together to form an air-chamber normally closed to the atmosphere. The lower end $A^4$ of the portion $A'$ of the casing A screws into the coupling or T B, secured to the water pipe-line $B'$ or other chambers containing water, so that the water of the pipe-line and the air contained in the water are readily passed into the casing A. In the latter is arranged a float C, secured to the valve-stem $D'$ of the tubular valve B, extending through an outlet-chamber E, formed in the section $A^2$, and connected by a pipe $E'$ with the atmosphere. The valve D is fitted to slide in suitably-packed seats F, arranged on the chamber E to prevent water or air from passing through the said seats from the casing to the chamber E. By extending the valve D through the chamber E, as plainly shown in Fig. 1, it is evident that the pressure of the air contained in the casing A is equal on the upper and lower ends of the valve, so that the latter is completely counterbalanced and readily moves in its seats F. At the extreme upper end of the valve D is a stem $D^2$, separate from the valve D and passing through a suitable stuffing-box held on the upper end of the section $A^3$ of the casing. The outer end of this stem $D^2$ is adapted to be engaged by the operator to permit him to press the valve D downward when it is desired to establish communication between the interior of the casing A and the atmosphere by way of the chamber E.

The valve D is provided with ports $a$ and $b$, normally connecting the interior of the valve D with the chamber E, as plainly shown in Fig. 1; but when the valve D moves downward then the ports $a$ open into the interior of the casing A, so that communication is established between the said casing and the chamber E by way of the ports $a$, the interior of the valve D, and the ports $b$. As the valve D is rigidly connected with the float C it is evident that the valve D moves up and down with the float as the latter rises and falls, according to the water passing into or out of the section A from the water pipe-line $B'$. The extreme lower end of the valve-stem $D'$ is connected with a slow-return attachment for the valve D, and this attachment is provided with a plunger G, fitted to slide in a cylinder H, suspended in the lower end $A^4$ of the casing A. The cylinder H is open at the top and closed at the bottom, and the plunger G is formed with perforations $c$, normally closed by a disk-valve I, fitted to slide loosely on the lower end of the stem $D'$. The plunger G is further provided with small ports $d$ to permit water to fill the cylinder H when the plunger G rises from the lowermost position.

Now it will be seen that when the float C falls in the casing A, on the water receding therefrom, then the water contained in the cylinder H passes out of the same through the perforations $c$, the disk-valve I then being lifted off its seat on top of the plunger G. Thus the water readily escapes from the cylinder H, and the float C, with the valve D, can quickly move into a lowermost position. When the casing A again fills with water from the pipe-line B', the float C then endeavors to rise up. As the disk-valve I then closes the perforation $c$ and water can then only enter the cylinder H by way of the small ports $d$ it is evident that the cylinder fills slowly, and consequently the upward movement of the plunger G is retarded, so that the float C and valve D move very slowly upward to disconnect the ports $a$ from the interior of the casing A, the valve D finally passing into the chamber E, as shown in Fig. 1.

The operation is as follows: When the pipe-line B' and the casing A are empty and the float C and valve D are in a lowermost position and when the pipe-line B' is now filled with water, the air in front of the water passes into the casing A by way of the valve D into the chamber E, and from the latter by the pipe E' to the atmosphere. When the pipe-line has been filled with water and the latter passes into the casing A, the float C then rises with the water entering the said casing, so that the valve D finally moves into an uppermost position to disconnect the interior of the casing A and the chamber E. Thus a further discharge of air or water from the pipe-line B' cannot take place. When the pipe-line B' is emptied of water, the latter recedes from the casing A and the float C and the valve D descend and the ports $a$ finally connect the interior of the casing A with the interior of the chamber E to permit the air from the outside to pass through the chamber E and the ports $b$ and $a$ to the interior of the casing A, so as to fill the latter with air and prevent a vacuum in the pipe-line B', which would otherwise take place on the receding of the water in the pipe-line. When the air accumulates in the casing A, then the water contained therein is displaced by the accumulating air, and consequently the float C falls and carries the valve D along, so as to finally establish communication between the interior of the casing A and the chamber E, allowing the accumulated air to pass to the atmosphere. As soon as the air has escaped from the casing A the water again fills the said casing and the float C rises and moves the valve D back to its normal position, as shown in Fig. 1. By having the slow-return attachment connected with the valve-stem D' the valve D is prevented from rising very suddenly, thus requiring the valve to take such time in closing as will enable the moving water to come gradually to a standstill.

In the modified form shown in Fig. 3 the float C' is attached to the valve $D^3$, extending through the chamber $E^2$ and formed with valves $D^4$ and $D^5$, adapted to be seated on valve-seats F' and $F^2$ and secured to the bottom and top of the chamber $E^2$. The valve $D^3$ is provided above the seat $D^4$ with a port $a'$ to connect the interior of the chamber $E^2$ with the interior of the casing $A^5$ whenever the float C' and the valve $D^3$ move into a lowermost position. The upper end of the valve $D^3$ is provided with a port $b'$ for connecting the upper end of the casing $A^5$ with the interior of the chamber $E^2$ when the downward movement of the float and valve takes place.

As illustrated in Fig. 4, the slow-return attachment for the valve is provided with a cylinder G', secured to the lower end of the valve-stem $D^6$, secured to the float $C^2$. The cylinder G' is fitted to slide over a plunger H', carried by the casing $A^6$, and formed in its upper end with a valve-seat $c'$, normally closed by a ball-valve I', contained in the plunger H'. The lower end of this plunger is perforated to permit water to pass to the inside of the plunger. The cylinder G' is formed near its upper end with very small ports $d'$ to permit water to pass to the inside of the cylinder when the latter is rising from a lowermost position.

Now it is evident that when the float $C^2$ moves downward the water contained in the cylinder G' forces the ball-valve I' off its seat, allowing the water to escape through the valve-seat $c'$ into the plunger H'. When the float $C^2$ moves upward, then the valve I' closes the seat $c'$ and water now passes slowly through the ports $d'$ into the cylinder G' to retard the upward movement of the float $C^2$, and consequently the closing of the valve I'.

In the modified form shown in Fig. 5 the valve-stem $D^7$, secured on the float $C^3$, is provided at its lower end with a plunger $G^2$, fitted to slide in the cylinder $H^2$, held in the casing $A^7$. The bottom of the cylinder $H^2$ is provided with a valve-seat $c^2$, normally closed by a ball-valve $I^2$, held in a cage $H^3$, attached to the lower end of the said cylinder. Small ports $d^2$ open into the lower end of the cylinder $H^2$ to fill the latter slowly when the plunger $G^2$ rises from a lowermost position, so as to retard the upward movement of the float and the valve attached thereto.

When the float $C^3$ moves downward, the water in the cylinder $H^2$ unseats the valve $I^2$ to permit the water to rapidly pass out of the said cylinder, so as to insure a quick downward movement of the float.

Having thus fully described my invention, I claim as new and desire to secure by Letters Patent—

1. The combination of the casing, the valve-chamber therein, said chamber communicating with the atmosphere, the float arranged in the casing and carrying a valve extending into the valve-chamber and adapted to establish a communication between said chamber and the casing, and a stem separate from the valve and projecting to the outside of the casing, said stem being arranged to engage the valve, substantially as and for the purpose set forth.

2. The combination of the casing, the valve-chamber therein, the float in the casing, the valve carried by the float and extending into the said chamber to establish a communication between the chamber and the casing, and the stem separate from the valve but alining therewith and projecting to the outside of the casing, substantially as described.

3. The combination of the casing having a connecting pipe or nipple at one end, a valve-chamber at the opposite end of the casing, a float between the connecting-pipe and the valve-chamber, a valve carried by the float and extending into said chamber to control the communication thereof with the casing, a stationary cylinder or guide located in the connecting-pipe and spaced from the walls thereof so as to form an annular chamber around said cylinder, and a body secured to the float and in sliding engagement with said cylinder, forming therewith a retarding device, substantially as described.

4. The combination of the casing having a connecting pipe or nipple at one end, a valve-chamber at the opposite end of the casing, a float between the connecting-pipe and the valve-chamber, a valve carried by the float and extending into said chamber to control the communication thereof with the casing, a stationary cylinder or guide located in the connecting-pipe and spaced from the walls thereof so as to form an annular chamber around said cylinder, and a piston secured to the float and fitted to slide within the said cylinder, forming therewith a retarding device, substantially as described.

THERON A. NOBLE.

Witnesses:
J. LORING WHITTINGTON,
J. W. HORNER.